Aug. 28, 1962  H. E. LINDBLOOM  3,050,810
METHOD AND MACHINE FOR CUTTING TILE PIPE
Filed March 15, 1957  5 Sheets-Sheet 3

Inventor
Henry E. Lindbloom
By: Schneider, Dressler & Goldsmith, Attys.

Aug. 28, 1962 H. E. LINDBLOOM 3,050,810
METHOD AND MACHINE FOR CUTTING TILE PIPE
Filed March 15, 1957 5 Sheets-Sheet 4
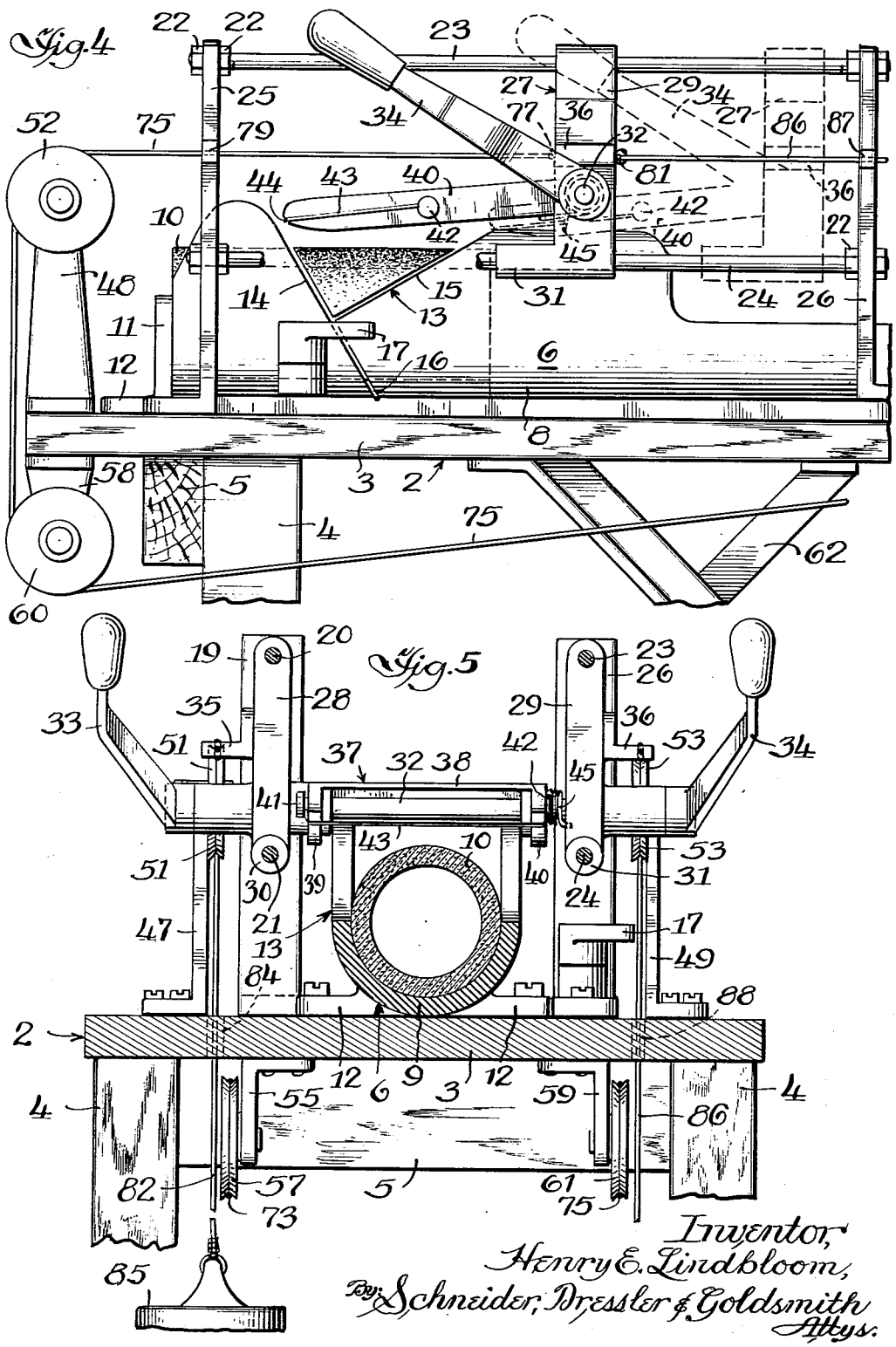
Inventor,
Henry E. Lindbloom,
By Schneider, Dressler & Goldsmith
Attys.

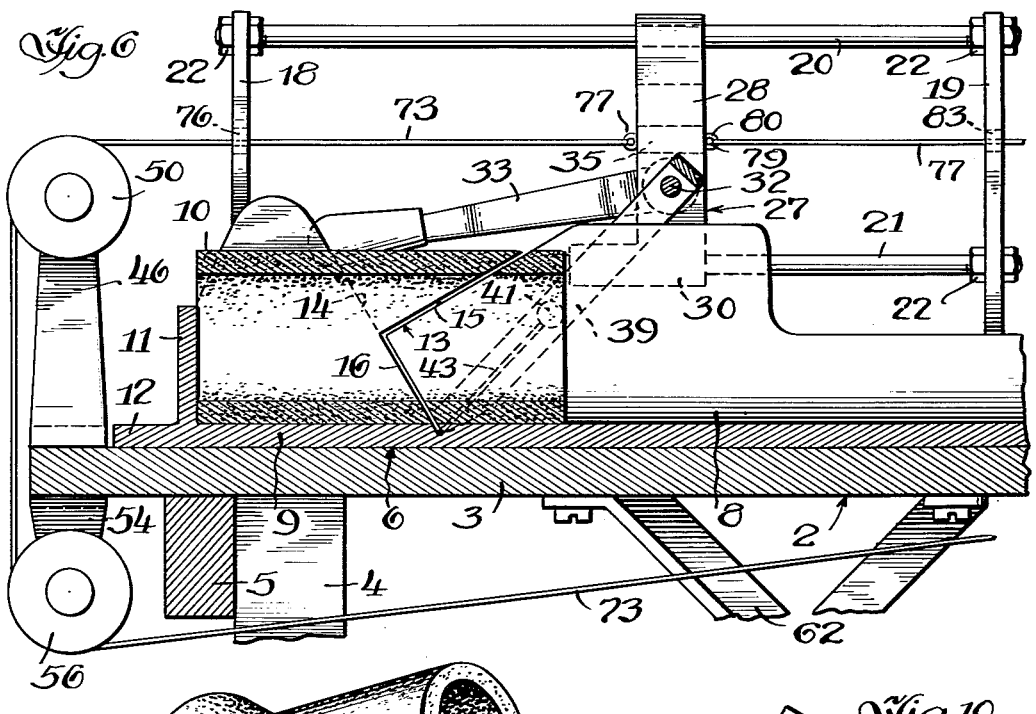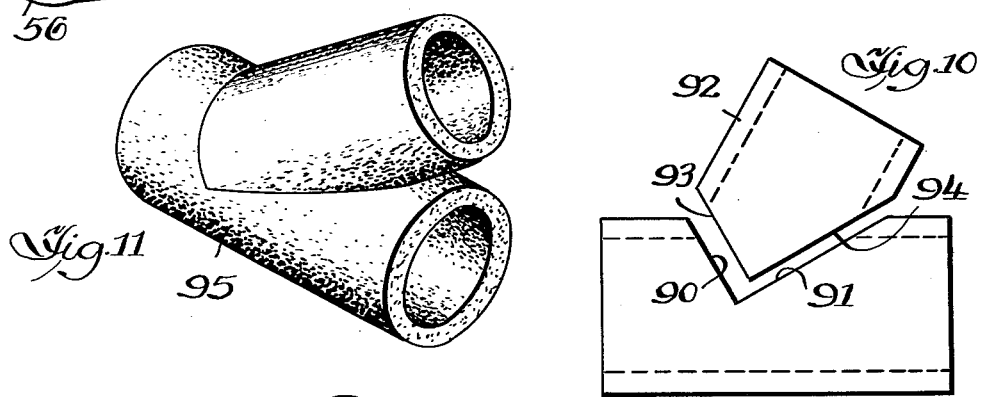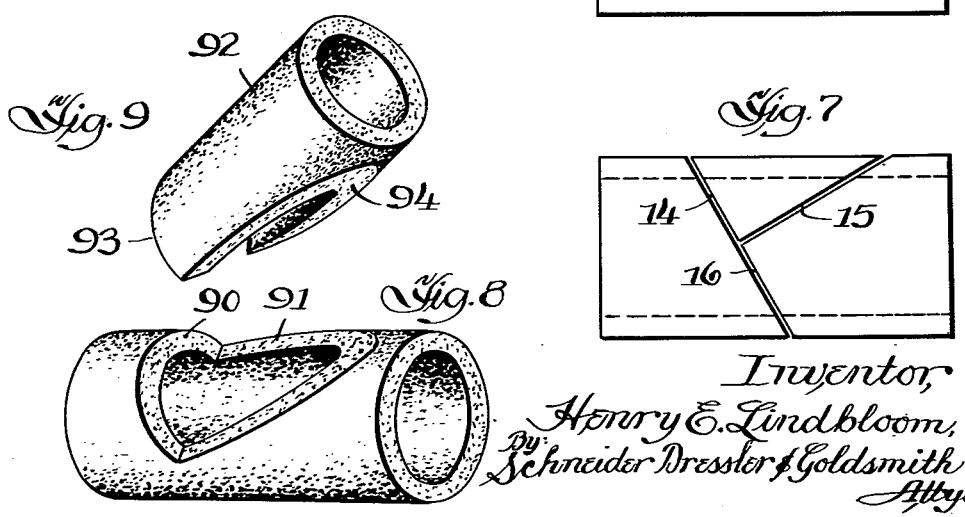

United States Patent Office 3,050,810
Patented Aug. 28, 1962

3,050,810
METHOD AND MACHINE FOR CUTTING
TILE PIPE
Henry E. Lindbloom, Tulsa, Okla., assignor to Martin-Marietta Company, a corporation of Illinois
Filed Mar. 15, 1957, Ser. No. 646,279
14 Claims. (Cl. 25—107)

This invention relates to a method and machine for angularly cutting straight pipe sections of uncured tile to facilitate the fabrication of pipe sections having an integral tubular extension intermediate its ends.

The present invention will be discussed particularly in connection with pipe sections in which the integral tubular extension projects angularly from the straight pipe section to form a Y-shaped pipe section.

In accordance with the invention, a plurality of straight pipe sections of uncured tile of uniform size are placed in a cutting guide frame, which may be in the form of an open top trough or similar supporting member adapted to hold the pipe sections against displacement during the cutting operation.

The cutting guide frame has a vertical wall extending transversely of the guide frame at its rear end to act as a stop against which a pipe section of uncured tile to be cut is positioned to prevent longitudinal displacement of the pipe section during the cutting operation. The guide frame has two side walls each defining three cutting lines along which a cutting wire may be moved. Two of the cutting lines are defined by angularly sloping cam surfaces on the top edges of the side walls which are shaped to form a notch. The angle of the rear edge of the notch is steeper than the angle of the forward edge. The two cutting lines intersect at the apex of the notch which is preferably in the horizontal median plane of the pipe section. The third cutting line is in the form of a slot which extends downwardly and forwardly from the apex of the notch along a line having the same angularity relative to the pipe section as the rear edge of the notch in the side wall of the cutting guide frame.

It should be noted that the term "rear" as used in the specification and claims shall indicate the end of the machine at which the operator normally stands, and shown at the left end of FIG. 2. The term "forward" shall be used throughout the specification and claims to indicate the direction away from the operator, or toward the right hand side of the machine as viewed in FIG. 2.

A pipe section of uncured tile positioned in the cutting guide frame may be cut to notch the pipe section for receiving an insert section, or may be cut to form an insert section. The first cut into the pipe section is the same, whether the pipe section is to be cut to form an insert section or to be notched to receive an insert section. A pivoted stop member is positioned adjacent the apex of the notch to prevent accidental movement of the cutting wire into the slot.

If the pipe section is to be notched, the stop member is kept in its operative position to limit the downward movement of the cutting wire. When the stop member is in its operative position the top surface of the stop member is in the same horizontal plane as the apex of the notch. When the cutting wire reaches the apex of the notch at the end of the first cut it engages the top surface of the stop member and is held against further movement in the direction of the first cut. The cutting wire is then retracted along the first cut line and is positioned for the second cut which extends downwardly and forwardly from the upper surface of the pipe section to the terminal of the first cut.

If the pipe section is to be cut to form an insert section, the stop member is turned on its pivot to move its top surface away from the apex of the notch. When the cutting wire is moved along the line of the first cut to the terminal of said first cut it is then moved from the apex of the notch along the third cutting line. Since the third cutting line starts from the apex of the notch it is not necessary to retract the cutting wire, and the cutting operation forming the insert section is continuous along the first and third cutting lines until the pipe section is completely severed.

Each cutting line extends angularly of the pipe section and therefore the movement of the cutting wire has a longitudinal and a vertical component. In the preferred embodiment of the machine illustrated in the drawings, the horizontal component of the movement of the cutting wire in one direction is obtained by foot power applied to a lever, and in the opposite direction by gravity as represented by weights pulling the cutting wire in the direction opposite that in which the foot power moves it. The vertical component of the movement of the cutting wire is obtained by hand pressure applied to either one of a pair of levers operatively connected to a U-shaped frame carrying the cutting wire.

Although the movement of the cutting wire is obtained by manually applied force, it is obvious that the cutting wire may be moved automatically by a suitable motor.

The insert sections are preferably of the same length, and each has one straight end and one angular end. The shape of the angular end of each insert section is complementary to the shape of the notch so that each angular end will fit snugly within the notch in any of the notched pipe sections. When the insert section is positioned within the notch of a notched pipe section, cement is applied around the meeting edges of the two sections. The cement has two functions in the fabrication of the Y-shaped pipe section. It prevents the possibility of any voids along the joint between the meeting edges of the insert section and the notched pipe section, and also minimizes the possibility of accidental displacement of the insert section from its proper position in the notch of the notched pipe section before the tile is fired.

The structure by means of which the above mentioned and other advantages of the invention are attained will be described in the following specification, taken in conjunction with the accompanying drawings, showing a preferred illustrative embodiment of the invention, in which:

FIG. 4 is a fragmentary side elevation of the machine showing a pipe section after the notching operation has been completed, with the cutting wire shown in dotted lines ready for the start of the next cutting operation;

FIG. 5 is cross sectional view, taken along the line 5—5 of FIG. 1;

FIG. 6 is a fragmentary longitudinal sectional view of the machine showing a pipe section after the completion of the cutting operation forming an insert section;

FIG. 7 is a diagrammatic view showing the angular relationship between the three cutting lines by means of which a pipe section may either be notched or cut to form an insert section;

FIG. 8 is a detail perspective view of a pipe section notched to receive an insert section;

FIG. 9 is a detail perspective view of an insert section;

FIG. 10 is a side elevation of a notched pipe section and an insert section being assembled; and FIG. 11 is a detailed perspective view of a Y-shaped pipe section.

Figure 1:
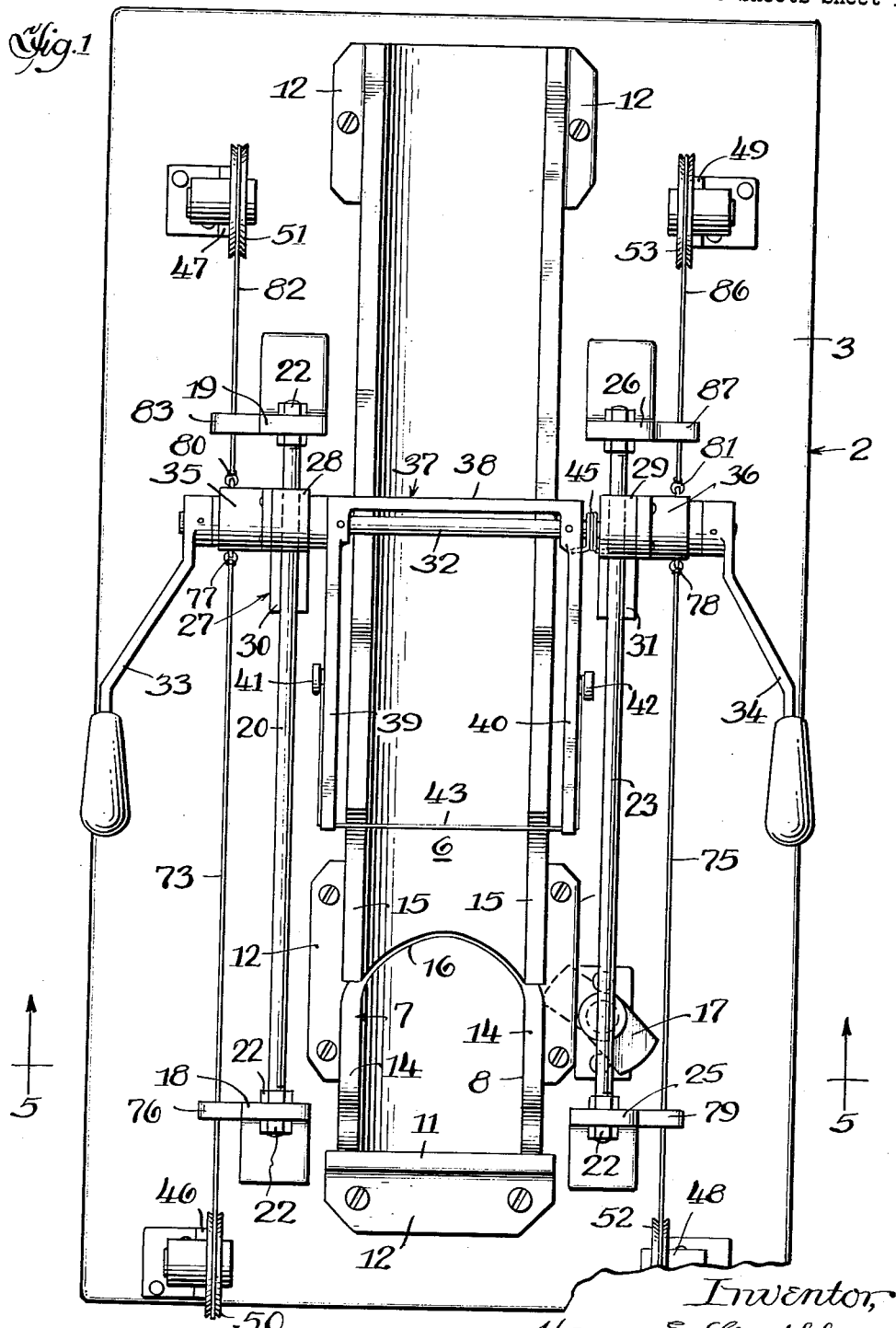
FIG. 1 is a top plan view of a machine embodying the invention, the rear end of the machine, at which the operator normally stands, being shown at the bottom of the figure.
Figure 2:
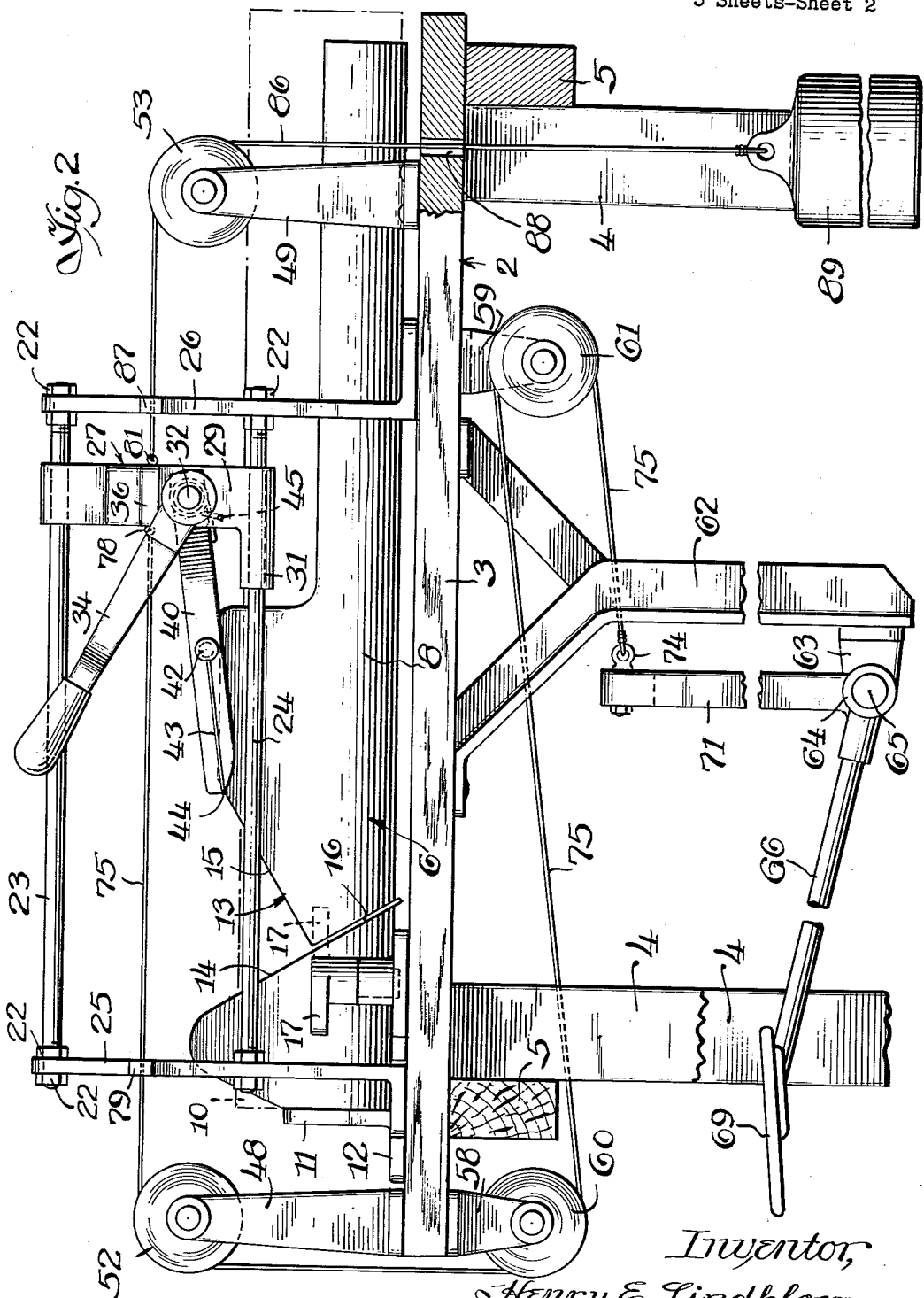
FIG. 2 is a side elevation of the machine, the front end of the machine being shown at the right side and the rear end being shown at the left side of the figure.
Figure 3:
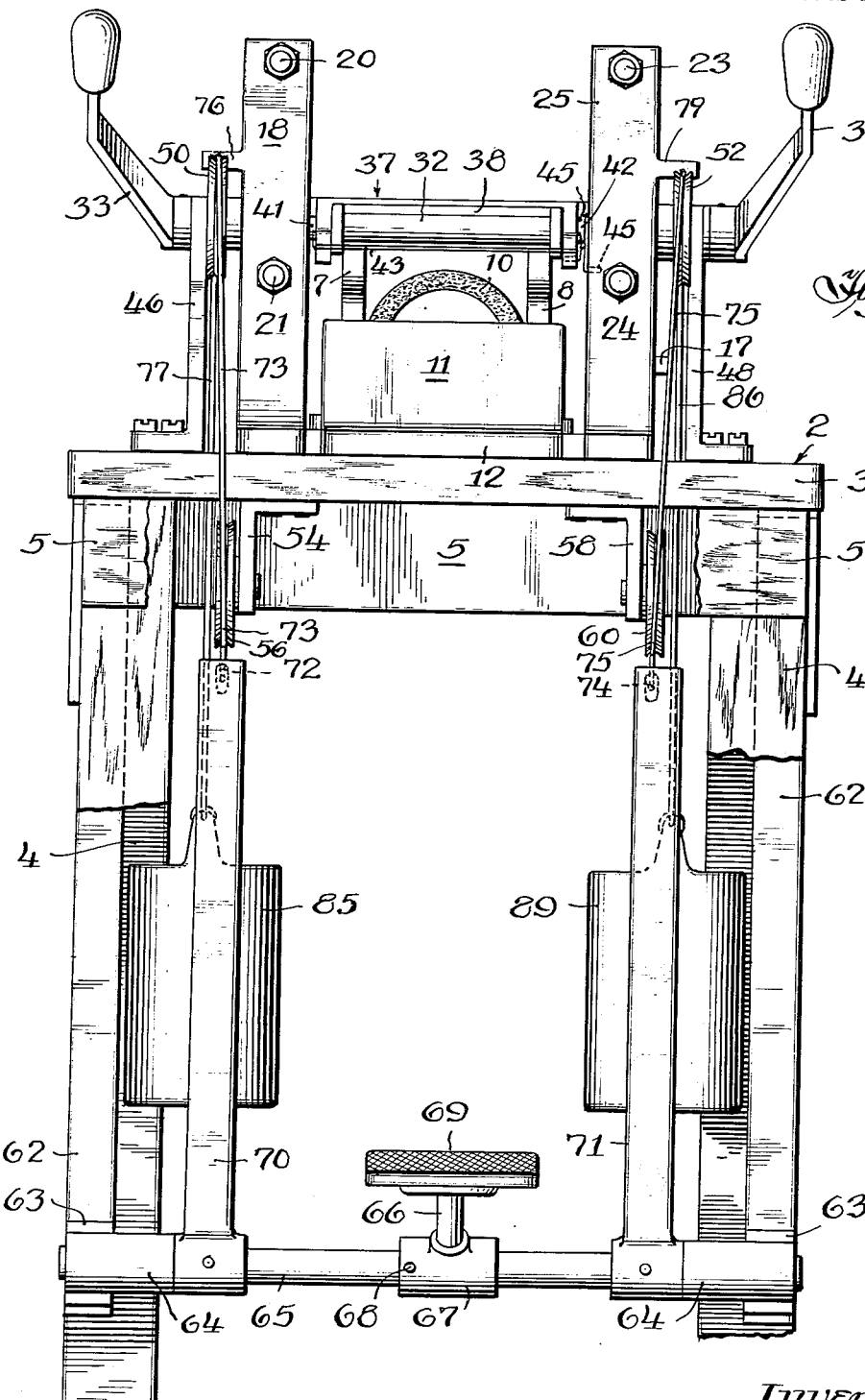
FIG. 3 is a rear end elevation, parts of the structure being broken away to facilitate illustration of the machine.

Referring to the drawings, the reference numeral 2 indicates a work table comprising a table top 3 and vertical supporting legs 4. The table structure is reinforced by a bar 5 extending transversely between the legs 4 at each end of the table. The transverse bars 5 are secured to the underside of the table and to both legs at each end of the table in any suitable manner.

A cutting guide frame 6 is centrally mounted on the table top and extends longitudinally thereof. The cutting guide frame comprises a pair of side walls 7 and 8, having their lower edges joined by a section 9 curved to conform to the curvature of a pipe section 10, and a vertical end wall 11 extending transversely between the side walls at the rear end of the cutting guide frame. The cutting guide frame has a plurality of horizontal flanges 12 extending laterally therefrom by means of which it is secured to the table top 3.

The cutting guide frame is shaped to hold a straight pipe section 10 against displacement while it is being cut by the apparatus hereinafter described. The machine is adapted to cut tile only when it is in the green, or uncured state, and the pipe sections are cured after they have been removed from the machine and shaped or assembled into final form.

The side walls 7 and 8 are each notched, as indicated at 13, to provide two cam surfaces forming cutting lines 14 and 15 extending along the top edges of the side walls which slope angularly to an apex preferably positioned in the horizontal median plane of a pipe section 10 positioned in the cutting guide frame. The cutting lines 14 and 15 preferably intersect at right angles but are so disposed that the angle of cutting line 14 relative to the pipe section 10 is steeper than the angle of cutting line 15. A third cutting line is formed by a slot 16 extending downwardly and forwardly from the apex of the notch 13 along a line coincident with cutting line 14. The slot 16 terminates in the curved section 9 of the cutting guide frame below the bottom surface of a pipe section positioned in the cutting guide frame. A stop member 17 pivotally mounted adjacent the apex of notch 13 is adapted to be moved into engagement with the apex of notch 13 to prevent accidental cutting below the apex of notch 13.

A pair of uprights 18 and 19 is secured to the table top 3 in longitudinally spaced relationship on one side of the cutting frame guide. The uprights project upwardly and are each provided with two vertically spaced apertures to receive a pair of longitudinal rods 20 and 21. Each rod is secured at each end by a pair of nuts 22 tightened against opposite surfaces of each upright. A second pair of longitudinal rods 23 and 24 is secured in the same manner to uprights 25 and 26 on the opposite side of the cutting frame guide.

The rods 20, 21, 23 and 24 cooperate to support a carriage 27 for sliding movement longitudinally of the table top. The carriage 27 comprises a pair of upstanding arms 28 and 29 each apertured adjacent its upper and lower end to slide along rods 20, 21 and rods 23, 24 respectively. The lower edge portion of each arm has an integral longitudinal extension 30 and 31, respectively, each of which is apertured in alignment with the lower aperture of its arm to slide on rods 21 and 24 respectively. The carriage 27 also includes a shaft 32 passing transversely through both arms 28 and 29 and rotatable relative to said arms.

A handle 33 is pinned to one end of shaft 32 and a similar handle 34 is pinned to the other end of the shaft to rotate with said shaft. A bracket 35 is secured to arm 28 and extends laterally outwardly therefrom. Another bracket 36 is similarly mounted on arm 29. The purpose of the brackets 35 and 36 will be described later.

A U-frame 37, comprising a transverse web 38 forming a closed end and a pair of legs 39 and 40 extending rearwardly from opposite ends of said web, is rigidly secured to the shaft 32. The legs 39 and 40 are each apertured adjacent the transverse web. The shaft 32 passes through the apertures and the legs 39 and 40 are rigidly secured to the shaft. The legs 39 and 40 of U-frame 37 straddle the cutting guide frame 6 and each is provided with a stud 41, 42 for holding the ends of a cutting wire 43. Studs 41 and 42 project laterally outward from legs 39 and 40, respectively, and each has one end of wire 43 wrapped around its shank so that the wire may be tightened to any desired degree of tautness. The wire extends around the free ends of legs 39 and 40, each of which is provided with a groove 44 to hold the wire against displacement relative to the legs of the U-frame.

From the foregoing description it is apparent that the carriage may be moved longitudinally of the table to position the wire 43 in any desired longitudinal position relative to a pipe section 10 positioned in the cutting guide frame 6. Either handle 33 or 34 may be swung downwardly to move the cutting wire through the pipe section to the extent permitted by the side walls of the cutting guide frame. A spring 45 coiled around shaft 32 between leg 40 and arm 29 has one end pressing against the arm and its other end pressing against the underside of the leg. Since the arm is a rigid part of the carriage 27, the spring exerts a constant force against the leg 40 urging the U-frame upwardly. Whenever the downward pressure applied against handle 33 or 34 is released, the U-frame automatically moves upwardly to lift the cutting wire above the pipe section.

The carriage 27 is moved longitudinally of the table top in the rearward direction by means of a foot power mechanism and in its forward direction by gravity, as hereinafter described.

The table top 3 is provided with a pair of upstanding brackets 46 and 47 secured thereto in longitudinally spaced relationship on one side of cutting guide frame 6, and a pair of similar brackets 48 and 49 on the opposite side of the cutting guide frame. Pulleys 50, 51, 52 and 53 are rotatably mounted on the brackets 46, 47, 48 and 49, respectively. Pulleys 50 and 51 are aligned with each other, and pulleys 52 and 53 are similarly aligned. Brackets 54 and 55 secured to the underside of table top 3 rotatably support pulleys 56 and 57, respectively, in alignment with pulleys 50 and 51. Brackets 58 and 59, also secured to the underside or table top 3, rotatably support pulleys 60 and 61, respectively, in alignment with pulleys 52 and 53.

Two support members 62 depend from the undersurface of table top 3 and each carries a bracket 63. A bearing 64 is mounted in each bracket, and a shaft 65 is rotatably mounted in the bearings. A lever 66 is rigidly secured to the shaft 65 by means of a collar 67 fixed to the shaft by a pin 68. The lever 66 extends rearwardly beyond the rear legs 4 of the work table to make its end accessible to the operator. A foot pedal 69 is secured to the outer end of lever 66 so that the operator may move shaft 65 rotatably by applying foot pressure to the pedal. The pedal is shown centrally of the table, but it is obvious that it may be fixed anywhere on shaft 65. The shaft may be extended beyond either side of the machine to position the pedal beyond the edge of the work table.

A lever 70 is rigidly secured to shaft 65 adjacent one bearing 64, and a similar lever 71 is rigidly secured to the shaft adjacent the other bearing. The upper end of lever 70 is provided with a ring 72 to which one end of a cord 73 is secured. The upper end of lever 71 has a ring 74 to which one end of a cord 75 is secured. From ring 72 the cord 73 extends around pulleys 57, 56 and 50, then through an apertured guide member 76 projecting laterally from the upright 18, and finally to a ring 77 projecting rearwardly from the bracket 35. The cord is tied to the ring 77. The cord 75 is similarly tied to a ring 78 projecting rearwardly from the bracket 36. The cord 75 passes over pulleys 61, 60 and 52 and then through an apertured guide member 79 projecting laterally from the upright 25.

Since the brackets 35 and 36 are respectively secured to the arms 28 and 29 of carriage 27, it is obvious that foot pressure on the pedal 69 moves the carriage 27 rearwardly a distance equal to the movement of the rings 72 and 74 to which the cords are tied. The brackets 35 and 36 are each positioned in a horizontal plane approximately midway between the rods 20 and 21 to prevent the carriage 27 from binding on the rods when it is pulled rearwardly by the application of foot pressure to pedal 69.

Longitudinal movement of the carriage 27 in the forward direction is obtained by gravity. The bracket 35 has a ring 80 projecting forwardly from its front edge and the bracket 36 has a ring 81 in the same relative position. A cord 82 tied to ring 80 extends through an apertured guide member 83 projecting laterally from the upright 19. The cord 82 extends around the pulley 51, and through an aperture 84 in table top 3. A weight 85 is tied to the other end of the cord. The weight 85 exerts a constant force urging the carriage 27 forwardly against the uprights 19 and 26.

A cord 86 is tied to the ring 81 on the forward edge of the bracket 36 and extends through an apertured guide member 87 projecting laterally from the upright 26, over the pulley 53, and downwardly through an aperture 88 in the table top 3. A weight 89 is tied to the other end of the cord 86. The weights 85 and 89 are equal so that equal forces are applied to the opposite ends of carriage 27.

The method of making Y-shaped tile pipe sections may be summarized as follows. A straight pipe section of uncured tile is placed in the cutting guide frame 6 with one end against rear wall 11. The weights 85 and 89 hold the carriage 27 forwardly against the uprights 19 and 26 and spring 45 holds the cutting wire 43 upwardly above the cutting guide frame. Foot pressure is applied to pedal 69 to move carriage 27 rearwardly, and hand pressure is applied simultaneously to either handle 33 or 34 to move the cutting wire 43 downwardly against the upper edges of the side walls 7 and 8 of the cutting guide channel. The hand pressure is maintained and causes the cutting wire 43 to follow the cam surface 15 as it cuts through the upper half of the pipe section 10. When the cutting wire reaches the apex of the notch 13 it is stopped by engagement with the cam surface 14 and the top surface of stop member 17. The foot pressure is then released to allow the weights 85 and 89 to move the carriage forwardly. The hand pressure is regulated so that the cutting wire follows the cam surface 15 as it is retracted.

When the cutting wire is clear of the pipe section foot pressure is again applied to pedal 69 without pressure on handle 33 or 34, and the carriage is moved rearwardly without moving the cutting wire downwardly. The longitudinal movement of the carriage 27 in the rearward direction is stopped when the cutting wire 43 engages the cam surface 14. The foot pressure is then released from pedal 69 and the handle 33 or 34 is pressed downwardly to cause the cutting wire 43 to engage the cam surface 14. The handle 33 or 34 is held down to cause the cutting wire 43 to follow the cam surface 14 as the weights 85 and 89 move the carriage forwardly and the cutting wire makes the second cut in the pipe section.

The notch in the pipe section is complete, and the forward movement of the carriage is stopped, when the cutting wire reaches the apex of the notch 13 and engages the top surface of stop member 17. The pipe section 10 is then removed from the cutting guide frame and the notched portion between lines 14 and 15 is removed from the pipe section.

The notched pipe section is shown in FIG. 8. The apex of the notch is in the median horizontal plane of the pipe section. One side of the notch is considerably shorter than the other, as indicated at 90 and 91, respectively.

When insert sections are to be made, the process is exactly as described above up to the completion of the first cut along the line defined by the cam surface 15. The stop member 17 is rotated to move its top surface way from the apex of notch 13. Instead of retracting the cutting wire along the cam surface 15, the pressure on handle 33 or 34 is maintained when the foot pressure is released, and the cutting wire is forced through slot 16 as the weights 85 and 89 move the carriage forwardly. The slot 16 extends below the bottom of the pipe section so that the pipe section is completely severed.

The insert section 92 has one end angular, as indicated at 93 and 94 in FIG. 8. The angularity of the surface 93 is the same as that of the surface 90 and the angularity of the surface 94 matches the angularity of surface 91 so that the insert 92 fits in the notch 90, 91 to form a Y-shaped pipe section 95, as shown in FIG. 11. After the insert is positioned in the notch, cement is applied along the joint between the angular end of the insert section and the notch of the pipe section. The Y-shaped unit 95 is then placed in a furnace and fired to cure the tile. The firing fuses the tile of both sections and the cement at the joint into an integral structure.

While I have described a preferred embodiment of my invention in considerable detail, it will be understood that the description is intended to be illustrative, rather than restrictive, as many details may be modified or changed without departing from the spirit or scope of my invention. Accordingly, I do not desire to be restricted to the exact details of construction described.

I claim:

1. A machine for cutting pipe sections of uncured tile which comprises a base, a cutting guide frame secured to said base, said cutting guide frame having an end wall engageable with one end of a horizontally disposed pipe section positioned in said frame to hold it against longitudinal displacement rearwardly relative to said machine, a carriage mounted for longitudinal movement relative to said cutting guide frame, a cutting wire pivotally secured to said carriage, said cutting wire extending transversely of said cutting guide frame, means for moving said carriage longitudinally relative to said cutting guide frame, and manually operable means pivotally mounted on said carriage and rigidly interconnected to said cutting wire for moving said cutting wire pivotally relative to said carriage simultaneously with said longitudinal movement.

2. A machine for cutting pipe sections of uncured tile which comprises a base, a cutting guide frame secured to said base and having an upstanding end wall engageable with one end of a pipe section positioned in said frame to hold it against longitudinal displacement rearwardly relative to said machine, a carriage mounted for longitudinal movement relative to said cutting guide frame, a U-frame having a closed end pivotally secured to said carriage, said U-frame having a pair of legs extending rearwardly from said carriage and straddling said cutting guide frame, a cutting wire having one end secured to each of said legs, means for moving said carriage longitudinally relative to said cutting guide frame, and manually operable means pivotally mounted on said carriage and rigidly connected to said U-frame for moving it pivotally relative to said cutting guide frame simultaneously with the longitudinal movement of said carriage to impart vertical movement to said cutting wire.

3. A machine for cutting pipe sections of uncured tile which comprises a cutting guide frame adapted to hold a pipe section, a carriage mounted for longitudinal movement relative to said cutting guide frame, said carriage including a rotatable shaft extending transversely relative to said cutting guide frame, a U-frame having a closed end fixed to said shaft, a cutting wire extending transversely across said cutting guide frame and having its ends secured to said U-frame, a handle fixed to said shaft for holding said cutting wire in cutting engagement with said pipe section, and spring means urging said U-frame upwardly to lift said cutting wire above said pipe section when said handle is released.

4. A machine for cutting pipe sections of uncured tile which comprises a cutting guide frame adapted to hold a pipe section, a carriage mounted for longitudinal movement relative to said cutting guide frame, a U-frame having a closed end pivotally secured to said carriage, said U-frame having a pair of legs extending rearwardly from said closed end and straddling said cutting guide frame, a cutting wire having one end secured to each of said legs, means for moving said carriage longitudinally, manually operable means for pivotally moving said U-frame simultaneously with the longitudinal movement of said carriage to impart vertical movement to said cutting wire, and a plurality of guiding surfaces on said cutting guide frame adapted to engage said cutting wire to guide said cutting wire in cutting engagement with said pipe section.

5. A machine for cutting pipe sections of uncured tile which comprises a base, a cutting guide frame mounted on said base and adapted to hold a pipe section, a support member secured to and projecting upwardly from said base, a carriage mounted on said support member for longitudinal movement relative to said cutting guide frame, a plurality of pulleys rotatably mounted on said base, a cord having one end secured to said carriage and its other end secured to said lever, said cord extending around said pulleys, said lever being operable by foot power to pull said cord for moving said carriage longitudinally in one direction, means operable by gravity for moving said carriage longitudinally in the opposite direction, said last mentioned means comprising a cord having one end secured to said carriage and a weight secured to its other end, said cords extending in opposite directions from said carriage, a pivotally mounted cutting wire secured to said carriage, said cutting wire extending transversely of said cutting guide frame, and manually operable means pivotally secured to said cutting guide frame and rigidly interconnected to said cutting wire for pivotally moving said cutting wire to cut said pipe section simultaneously with the longitudinal movement of said carriage in either direction.

6. A machine for cutting pipe sections of uncured tile which comprises a table top, a cutting guide frame mounted on said table top for holding a pipe section, said cutting guide frame having two vertical side walls each notched to provide two cam surfaces on its upper edge, said cam surfaces intersecting and terminating in a horizontal plane spaced above said table top, a carriage mounted for longitudinal movement relative to said cutting guide frame, means to move said carriage longitudinally, a U-frame pivotally secured to said carriage, a cutting wire secured to said U-frame and extending transversely across said cutting guide frame, and means for holding said cutting wire in engagement with said cam surfaces while said carriage is being moved longitudinally.

7. A machine for cutting pipe sections of uncured tile which comprises a table top, a cutting guide frame mounted on said table top for holding a pipe section, said cutting guide frame having two vertical side walls each notched to provide two cam surfaces on its upper edge, said cam surfaces intersecting and terminating in a horizontal plane spaced above said table top, a slot in each side wall extending downwardly at an angle from said intersection, a carriage mounted for longitudinal movement relative to said cutting guide frame, means to move said carriage longitudinally, a U-frame pivotally secured to said carriage, a cutting wire secured to said U-frame and extending transversely across said cutting guide frame, and means for holding said cutting wire in engagement with one of said cam surfaces while said carriage is being moved longitudinally of said cutting guide in one direction, to form one cut in a pipe section held in said cutting guide frame, and for selectively holding said cutting wire in engagement with said other cam surface or with said slot while said carriage is being moved in the opposite direction, to form a second cut in said pipe section, whereby said pipe section is selectively notched or transformed into an insert section.

8. A machine for cutting pipe sections of uncured tile which comprises a table top, a cutting guide frame mounted on said table top for holding a pipe section, said cutting guide frame having two vertical side walls each notched to provide two cam surfaces on its upper edge, said cam surfaces intersecting and terminating in a horizontal plane above said table top, a slot in each side wall extending downwardly at an angle from said intersection, a carriage mounted for longitudinal movement relative to said cutting guide frame, means to move said carriage longitudinally, a U-frame pivotally secured to said carriage, a cutting wire secured to said U-frame and extending transversely across said cutting guide frame, and means for holding said cutting wire in engagement with one of said cam surfaces or said slot while said carriage is being moved longitudinally of said cutting guide, and a stop member secured adjacent the intersection of said cam surfaces, said stop member being movable into operative position to prevent movement of said cutting wire into said slot.

9. A method of notching a pipe section of uncured tile which comprises holding a pipe section of uncured tile against movement, applying a cutting tool transversely against the outer surface of said pipe section, directing a gravitational force in a horizontal plane by securing one end of a cord to a weight and extending said cord over a pulley mounted for rotation about a horizontal axis forwardly of said cutting tool, securing the other end of said cord to said cutting tool to apply said horizontally directed gravitational force to said cutting tool to urge it forwardly, simultaneously applying a rearwardly directed force greater than said gravitational force and a downward pressure to said cutting tool as two separate independent forces to cut said pipe section angularly along a rearwardly and downwardly extending cam surface defining a first cutting line, releasing said downward and rearward forces and retracting said cutting tool along the cam surface defining said first cutting line by said gravitational force, moving said cutting tool against said gravitational force to a second position on the outer surface of said pipe section rearwardly of the rear end of said first cutting line, moving said cutting tool forwardly by said gravitational force and simultaneously applying downward pressure against said cutting tool to cut said pipe section along a second cutting line extending forwardly and downwardly at an angle to intersect said first cutting line, and releasing said downward pressure when said cutting tool meets said first cutting line.

10. A method of making a tile pipe section of Y-shape which comprises cutting a first straight pipe section of uncured tile along a first cutting line extending from a point in the upper surface of said first pipe section rearwardly and downwardly approximately half way through said first pipe section, cutting said first pipe section along a second cutting line extending downwardly and forwardly from a point on the upper surface of said first pipe section rearward of the lower end of said first cutting line to intersect said first cutting line at its rear end, removing the portion of said first pipe section between said cuts to form a notch, cutting a second pipe section along a third cutting line corresponding with said first cutting line, cutting through said second pipe section along a fourth cutting line extending downwardly and forwardly from the rear end of said third cutting line at an angle corresponding to the angle between said first and second cutting lines to form an insert section having an angular rear end matching said notch, positioning the angular rear end of said insert section in said notch with the third and fourth cut portions of said insert section juxtaposed respectively against the first and second cut portions of said notch, and curing said pipe and insert sections in said assembled relationship.

11. A method of forming an insert section for assembly with an uncured notched pipe section which comprises holding a horizontally disposed second pipe section of uncured tile against movement, moving a transversely disposed cutting wire into engagement with the outer top surface of said second pipe section, pressing said cutting wire downwardly and simultaneously moving it rearwardly of said second pipe section to cut said second pipe section through approximately half its depth along an angularly disposed plane, stopping the rearward movement of said cutting wire when it reaches the vertical center of said second pipe section, directing a gravitational force in a horizontal plane by securing one end of a cord to a weight and extending said cord over a pulley mounted for rotation about a horizontal axis forwardly of said cutting tool, securing the other end of said cord to said cutting tool to apply said horizontally directed gravitational force to said cutting tool to urge it forwardly, and releasing the rearward pressure while continuing the downward pressure on said cutting wire to cause said cutting wire to move forwardly by gravity as it is forced downwardly to cut through the lower half of said second pipe section.

12. A machine for cutting pipe sections of uncured tile which comprises a base, a cutting guide frame secured to said base and adapted to hold a horizontally disposed pipe section, a support member secured to said base and projecting upwardly above said cutting guide frame, a carriage slidably mounted on said support member, a cutting wire secured to said carriage and extending transversely of said cutting guide frame, means on said cutting guide frame for guiding said cutting wire, means for moving said carriage and cutting wire longitudinally relative to said pipe section, and hand operated means pivotally mounted on said carriage for moving said cutting wire downwardly simultaneously with said longitudinal movement.

13. A machine for cutting pipe sections of uncured tile which comprises a base, a cutting guide frame secured to said base, said cutting guide frame having an end wall engageable with one end of a horizontally disposed pipe section to hold it against longitudinal displacement rearwardly relative to said machine, a support member secured to said base and projecting upwardly above said cutting guide frame, a carriage slidably mounted on said support member, a cutting wire secured to said carriage and extending transversely of said cutting guide frame, said cutting guide frame having a pair of side walls provided with corresponding notches extending downwardly from the upper edges thereof, means for moving said carriage and cutting wire longitudinally rearwardly over the portion of the base to which said cutting guide frame is secured, and hand operable pressure means pivotally mounted on said carriage for moving said cutting wire downwardly to cut said horizontally disposed pipe section during the longitudinal rearward movement of said carriage and cutting wire.

14. A machine for cutting pipe sections of uncured tile which comprises a base, a cutting guide frame secured to said base and adapted to hold a horizontally disposed pipe section, a support member projecting upwardly from said base, a carriage slidably mounted on said support member, a pair of legs pivotally mounted on said carriage adjacent opposite edges thereof, a cutting wire secured to said legs and extending transversely of said cutting guide frame, means for moving said carriage and cutting wire longitudinally relative to said cutting guide frame, hand operable pressure means pivotally mounted on said carriage and operatively connected to said legs for moving said cutting wire downwardly into engagement with the upper edges of said cutting guide frame simultaneously with said longitudinal movement, and a cam surface on the upper edges of said cutting guide frame for guiding said downward movement of said cutting wire.

References Cited in the file of this patent

UNITED STATES PATENTS

| 300,909 | Smith | June 24, 1884 |
| 744,363 | Kondolf | Nov. 17, 1903 |
| 877,151 | Willett | Jan. 21, 1908 |
| 899,980 | Hill | Sept. 29, 1908 |
| 1,828,462 | Fry et al. | Oct. 20, 1931 |
| 1,834,970 | Russell | Dec. 8, 1931 |
| 1,880,872 | Denton | Oct. 4, 1932 |
| 2,644,217 | Agar | July 7, 1953 |
| 2,712,169 | Buttress | July 5, 1955 |

FOREIGN PATENTS

| 53,948 | Germany | Oct. 21, 1890 |
| 620,260 | France | Jan. 15, 1927 |

UNITED STATES PATENT OFFICE
CERTIFICATE OF CORRECTION

Patent No. 3,050,810                                                     August 28, 1962

Henry E. Lindbloom

It is hereby certified that error appears in the above numbered patent requiring correction and that the said Letters Patent should read as corrected below.

In the grant, lines 1 and 2, for "Henry E. Lindbloom, of Tulsa, Oklahoma, assignor to Martin-Marietta Company, a corporation of Illinois," read -- Henry E. Lindbloom, of Tulsa, Oklahoma, assignor, by mesne assignment, to Martin-Marietta Corporation, a corporation of Maryland, --; line 11, for "Martin-Marietta Company, its successors" read -- Martin-Marietta Corporation, its successors; in the heading to the printed specification, lines 4 and 5, for "Henry E. Lindbloom, Tulsa, Okla., assignor to Martin-Marietta Company, a corporation of Illinois" read -- Henry E. Lindbloom, Tulsa, Okla., assignor, by mesne assignment, to Martin-Marietta Corporation, a corporation of Maryland --.

Signed and sealed this 9th day of April 1963.

(SEAL)
Attest:

ESTON G. JOHNSON
Attesting Officer

DAVID L. LADD
Commissioner of
Patents